US006564750B1

United States Patent
Collins

(10) Patent No.: US 6,564,750 B1
(45) Date of Patent: May 20, 2003

(54) AUTOMOBILE PET SAFETY SEAT

(76) Inventor: Kim Marie Collins, 1366 Wood Duck Trail, Naples, FL (US) 34106

( * ) Notice: Subject to any disclaimer, the term of this patent is extended or adjusted under 35 U.S.C. 154(b) by 0 days.

(21) Appl. No.: 10/040,519

(22) Filed: Jan. 7, 2002

(51) Int. Cl.[7] .............................................. B60R 22/00
(52) U.S. Cl. ...................................... 119/771; 297/254
(58) Field of Search .............................. 119/771, 28.5; 297/250.1, 254, 255; 5/94

(56) References Cited

U.S. PATENT DOCUMENTS

| | | | |
|---|---|---|---|
| 1,261,951 A | * | 4/1918 | MacGowan |
| 1,363,667 A | * | 12/1920 | Mahr |
| 1,629,834 A | * | 5/1927 | Miller |
| 1,698,601 A | * | 1/1929 | Merrill |
| 1,912,514 A |   | 6/1933 | Curtis et al. |
| 2,224,999 A |   | 12/1940 | Mover |
| 2,499,103 A | * | 2/1950 | Love |
| 3,436,770 A | * | 4/1969 | Turner |
| 3,857,365 A | * | 12/1974 | Mueller |
| 4,512,286 A |   | 4/1985 | Rux |
| 4,597,359 A |   | 7/1986 | Moorman |
| 5,123,377 A |   | 6/1992 | Edwards |
| 5,133,294 A | * | 7/1992 | Reid |
| 5,785,003 A |   | 7/1998 | Jacobson et al. |

OTHER PUBLICATIONS

R.C. Steele Pet Supplies, Oct. 2001, p. 29.
People Weekly, Nov. 19, 2001, "Buckle Pup for Safety", p. 123.

* cited by examiner

Primary Examiner—Thomas Price
(74) Attorney, Agent, or Firm—Edward M. Livingston

(57) ABSTRACT

An automobile pet-safety seat has a pet-seat nest (1) that is suspended arcuately downward intermediate horizontal rods of a nest frame (2). A rear rod (3) of the nest frame is supported vertically in a proximately horizontal attitude by detachable attachment to a top portion of a seat back (8) of a car seat (11) by a rear-rod strap (9) that is articulated to be loop-fastened to a head rest (10) of the car seat. A frame front (6) of the nest frame is supported in a horizontal attitude by a frame brace (12) having pivotally angular orientation intermediate a front rod (7) and a variably orthogonal portion (16) of the car seat. A fastener strap (17) under the pet-seat nest is affixed to the front rod and attached detachably to the head rest. The fastener strap is positioned under the pet-seat nest where a conventional seat belt (18) can be loop-fastened to it for holding the automobile pet-safety seat down in opposition to the frame brace and the rear rod that is supported by the rear-rod strap for a rigidly reliable three-point attachment to the car seat. A pet-safety strap (19) is attached to the rear rod and extended forwardly for attachment to a pet clasp that can include a collar or harness on a pet that is on the pet-seat nest.

16 Claims, 5 Drawing Sheets

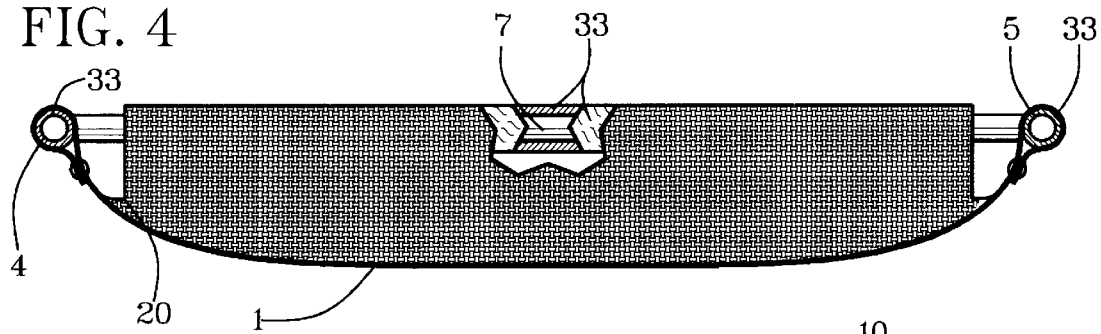
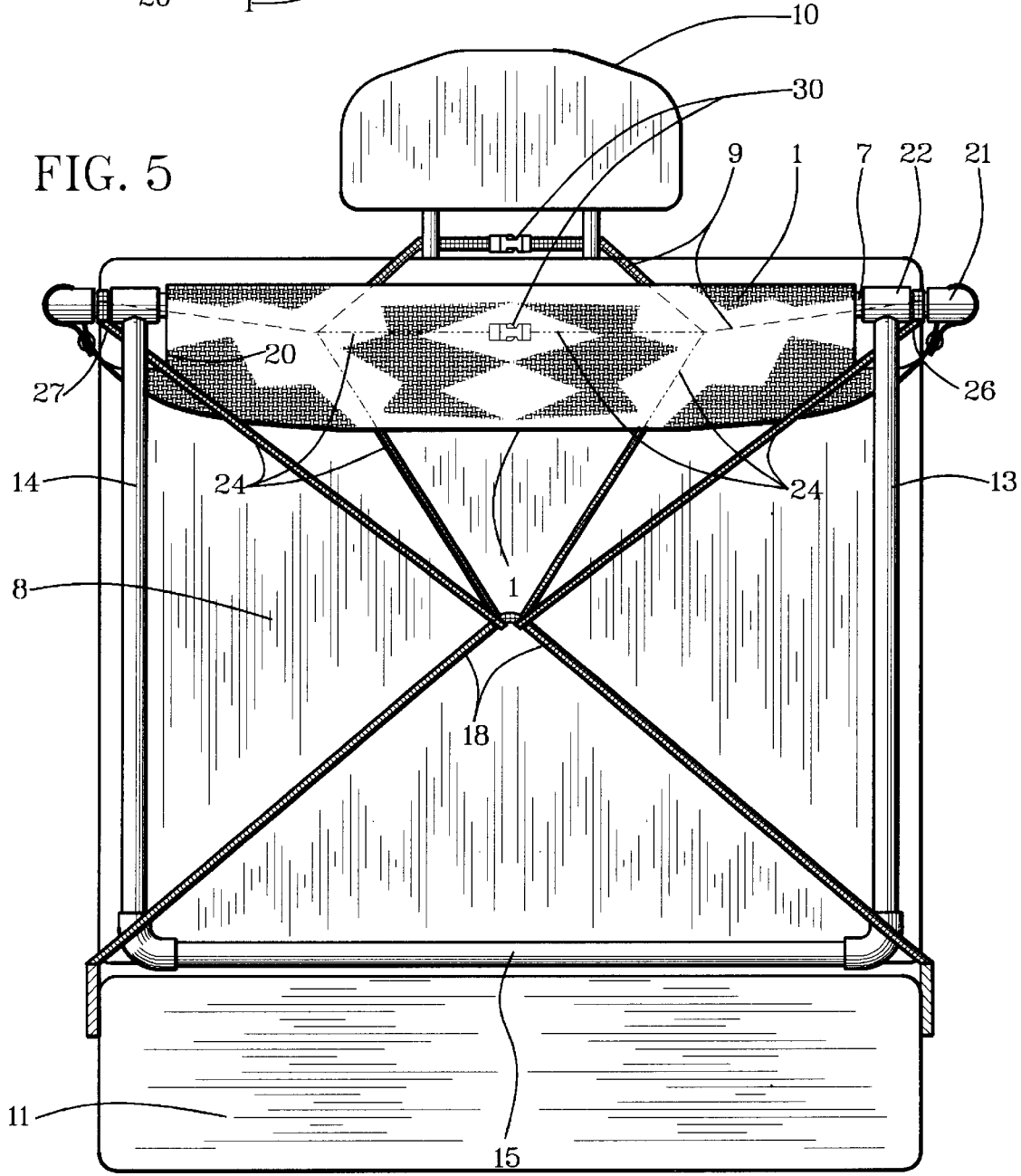

AUTOMOBILE PET SAFETY SEAT

BACKGROUND OF THE INVENTION

This invention relates to safety seats for pets, particularly small dogs, in automobiles.

Allowing a small dog or other pet to see out a car window from the passenger seat or a rear-seat in a safe manner is a benefit to pet owners and pets alike. There are known containers for small dogs and other pets in cars, but none with the convenience of use, pet safety, pet comfort and pet positioning by a window in a manner taught by this invention.

Examples of most-closely related known but different devices are described in the following patent documents:

| U.S. Pat. No. | Inventor | Issue Date |
| --- | --- | --- |
| 1.012.514 | Curtis, et al. | 06-06-1933 |
| 2,224,999 | Mover | 12-17-1940 |
| 2,499,103 | Love | 02-28-1950 |
| 4,512,286 | Rux | 04-23-1985 |
| 4,597,359 | Moorman | 07-01-1986 |
| 5,123,377 | Edwards | 06-23-1992 |
| 5,133,294 | Reid | 07-28-1992 |
| 5,785,003 | Jacobson, et al. | 07-28-1998 |
| Publication | R. C. Steele Pet Supplies | Oct. 2001 |
| Publication | People Weekly | Nov. 19, 2001 |

SUMMARY OF THE INVENTION

Objects of patentable novelty and utility taught by this invention are to provide an automobile pet-safety seat which:

positions a small dog or other pet where it can see out a front or rear car window safely;

is easy to put in and take out of a car;

is rigid and sturdy;

is comfortable for the pets;

provides protection of the pets against sudden stops;

is easily cleanable; and minimizes obstruction of people nearby.

This invention accomplishes these and other objectives with an automobile pet-safety seat having a pet-seat nest that is suspended arcuately downward intermediate horizontal rods of a nest frame. A rear rod of the nest frame is supported vertically in a proximately horizontal attitude by detachable attachment to a top portion of a back of a car seat by a rear-rod strap that is articulated to be loop-fastened to a head rest of the car seat. A front portion of the nest frame is supported in a horizontal attitude by a frame brace having pivotally angular orientation intermediate the front rod and a variably orthogonal portion of the car seat. A fastener strap under the pet-seat nest is affixed to the front rod and attached detachably to the head rest. The fastener strap is positioned under the pet-seat nest where a conventional seat belt can be loop-fastened to it for holding the automobile pet-safety seat down in opposition to the frame brace and the rear rod that is supported by the rear-rod strap for a rigidly reliable three-point attachment to the car seat. A pet-safety strap is attached to the rear rod and extended forwardly for attachment to a pet clasp that can include a collar or harness on a pet that is on the pet-seat nest.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 4 is a section view taken through section line 2–2 of FIG. 2;

FIG. 5 is a front view of an installed automobile pet-safety seat having a fastener strap that is a loop strap attachable to a rear-rod strap;

DESCRIPTION OF PREFERRED EMBODIMENT

Figure 1:
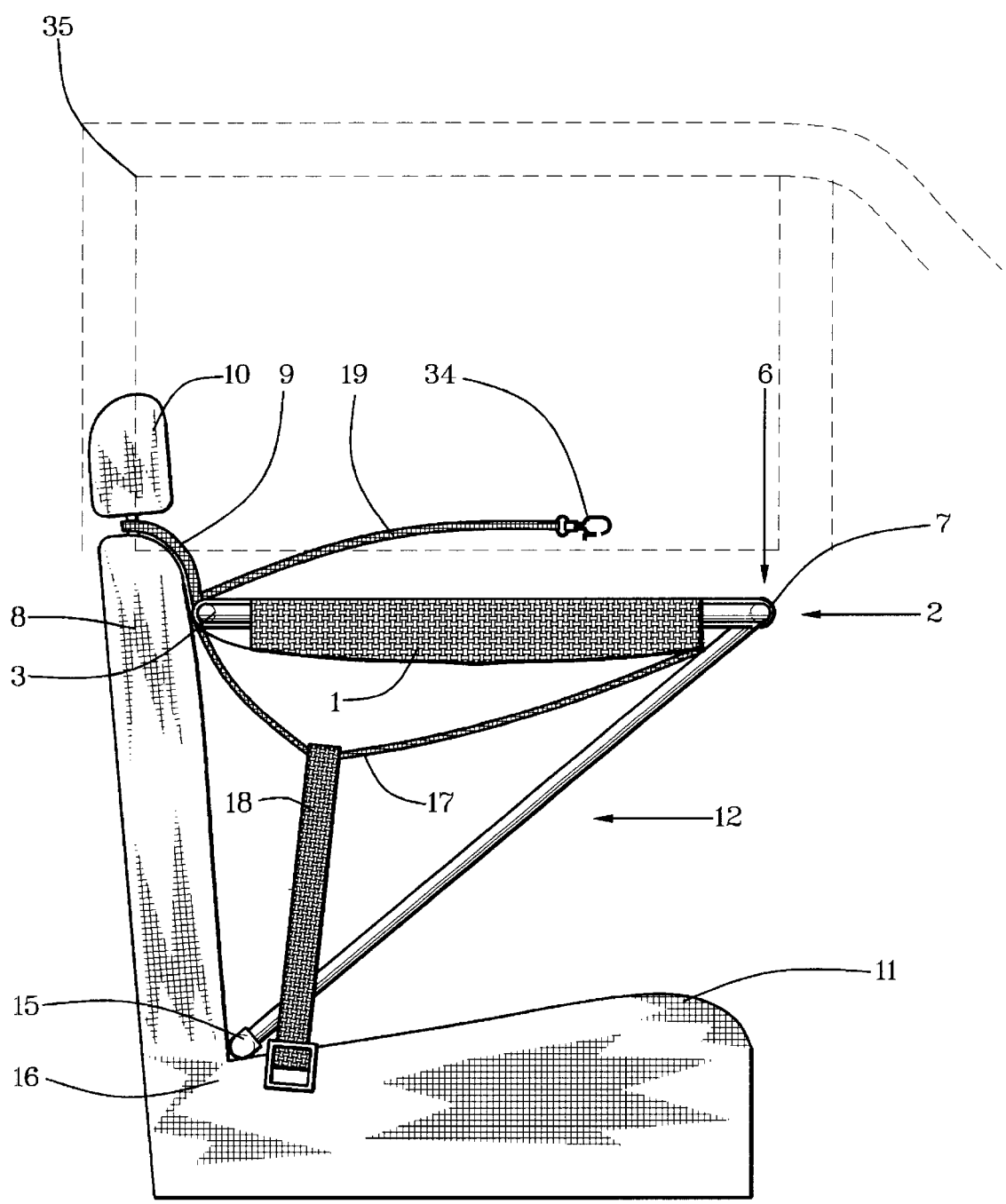
FIG. 1 is a side elevation view of an automobile pet-safety seat installed on a car seat in positional relationship to a car window shown in dashed lines.

Listed numerically below with reference to the drawings are terms used to describe features of this invention. These terms and numbers assigned to them designate the same features throughout this description.

1. Pet-seat nest
2. Nest frame
3. Rear rod
4. First side rod
5. Second side rod
6. Frame front
7. Front rod
8. Seat back
9. Rear-rod strap
10. Head rest
11. Car seat
12. Frame brace
13. First brace rod
14. Second brace rod
15. Bottom brace rod
16. Orthogonal portion
17. Fastener strap
18. Seat belt
19. Pet-safety strap
20. Orthogonal cutouts
21. Tubular elbows
22. Tubular T's
23. Material bands
24. Loop strap
25. Line strap
26. First loop end
27. Second loop end 28. First line end
29. Second line end
30. Quick-disconnect buckles
31. Inflatable covering
32. Resilient covering
33. Cushiony padding
34. Snap fastener
35. Car window Referring to FIGS. 1–5, an automobile pet-safety seat has a pet-seat nest 1 that includes flexible fabric that is preferably cloth-like and suspended arcuately downward like a hammock or a nest from intermediate horizontal rods of a nest frame 2. As long as the nest frame 2 provides sufficient space for the pet using the pet seat, the shape of the nest frame 2 may take almost any configuration, such as rectangular, circular, triangular and os forth. In its preferred rectangular shape as illustrated in the drawing figures, the nest frame 2 has a rear rod 3, a first side rod 4, a second side rod 5 and a frame front 6 having a front rod 7. The rear rod 3 is supportable vertically in a proximately horizontal attitude by detachable attachment to a top portion of a seat back 8 by a rear-rod strap 9 that is loop-fixable to a head rest 10 of a car seat 11.

The frame front 6 is supportable in a horizontal attitude by a frame brace 12 that is pivotal on the frame front 6 to an angular orientation downwardly and rearwardly. The frame brace 12 includes a first brace rod 13 that is attached pivotally to a first side of the frame front 6, a second brace rod 14 that is attached pivotally to a second side of the frame front 6, and a bottom brace rod 15 that is extended intermediate a bottom end of the first brace rod 13 and a bottom end of the second brace rod 14.

A bottom of the frame brace 12 is articulated for being buttressed against a generally orthogonal portion 16 of the seat back 8 of the car seat 11.

A fastener strap 17 is positioned under the pet-seat nest 1 intermediate the frame front 6 and proximate the rear rod 3 for being loop-fastened to an automobile by a conventional seat belt 18.

A pet-safety strap 19 is attached to the rear rod 3 and extended to a position of attachment to a pet clasp that can include a collar or harness that are not shown on a pet.

The first brace rod 13 and the second brace rod 14 are preferably parallel but need not be. The frame front 6 can be shorter than the rear rod 3 on pivotal portions of the first brace rod 13 and the second brace rod 14 can be positioned inwardly from corners of the nest frame 2 for a generally truncate triangular shape of the frame brace 12.

The pet-seat nest 1 preferably has orthogonal cutouts 20 at corners to allow rectangular ends of the pet-seat to be looped-fastened to the nest frame 2. The orthogonal cutouts 20 can be as large as required for corner structure that can include tubular elbows 21, tubular T's 22 and material bands 23 of strap, belt, line or other flexible material of the rear-rod strap 9 and the fastener strap 17.

Figure 2:
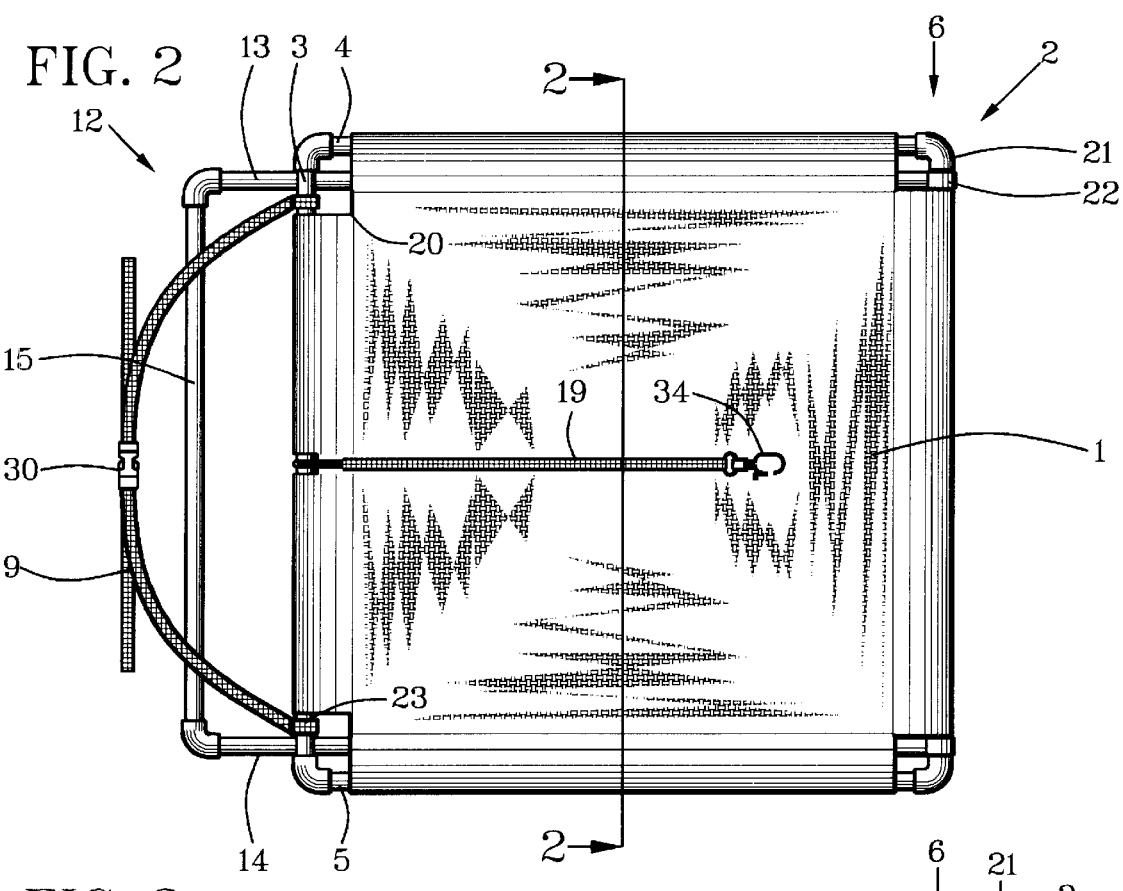
FIG. 2 is a top view of a folded automobile pet-safety seat.
Figure 3:
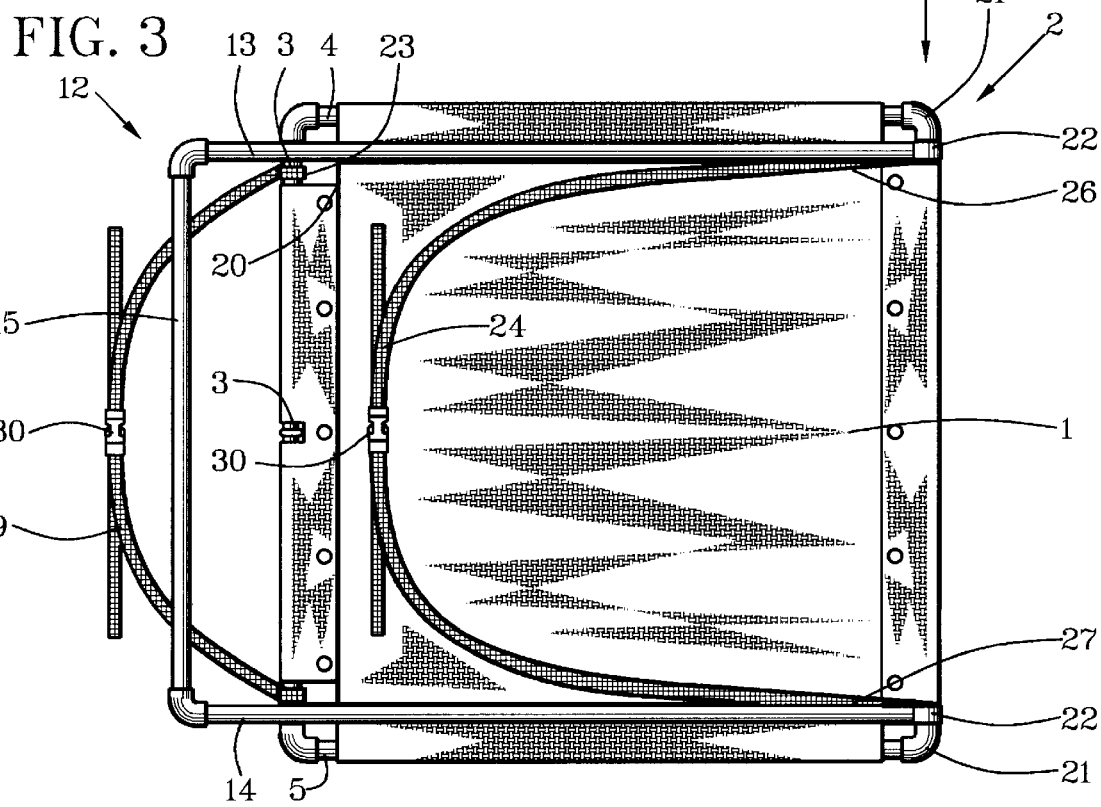
FIG. 3 is a bottom view of the FIG. 2 illustration.
Figure 6:
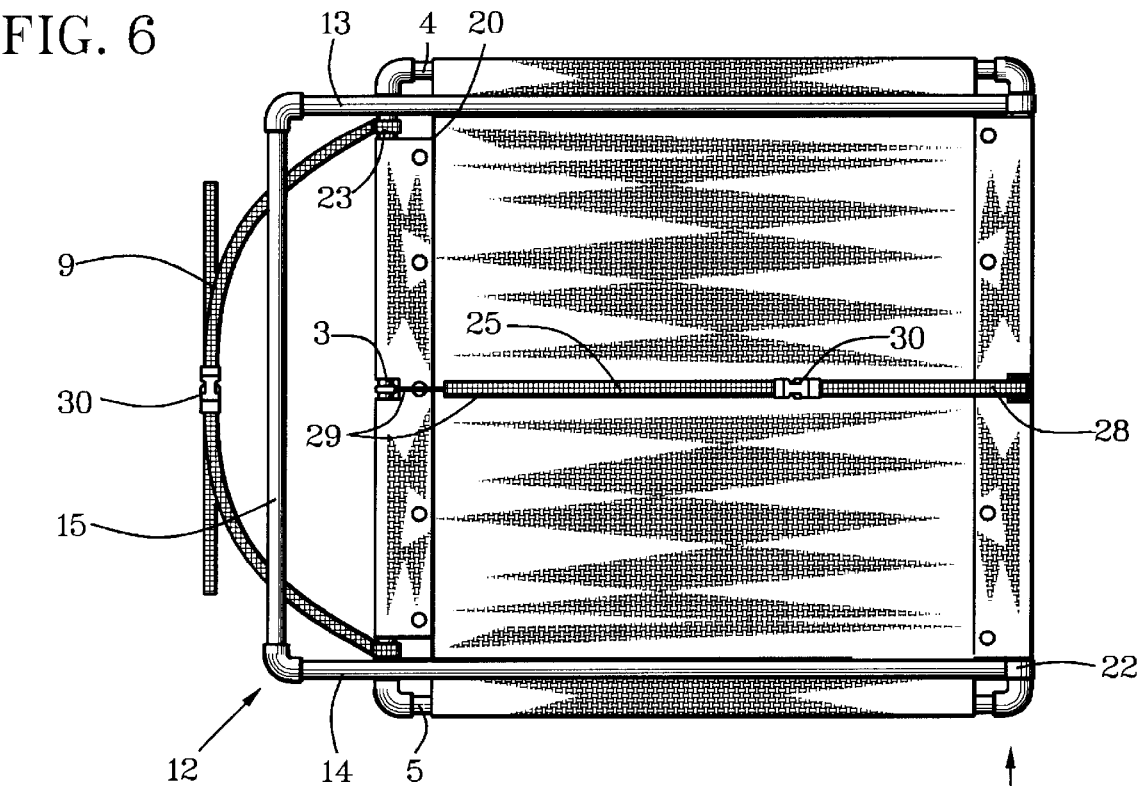
FIG. 6 is a bottom view of a folded automobile pet-safety seat having a fastener strap that is a line strap attachable to a rear rod.
Figure 7:
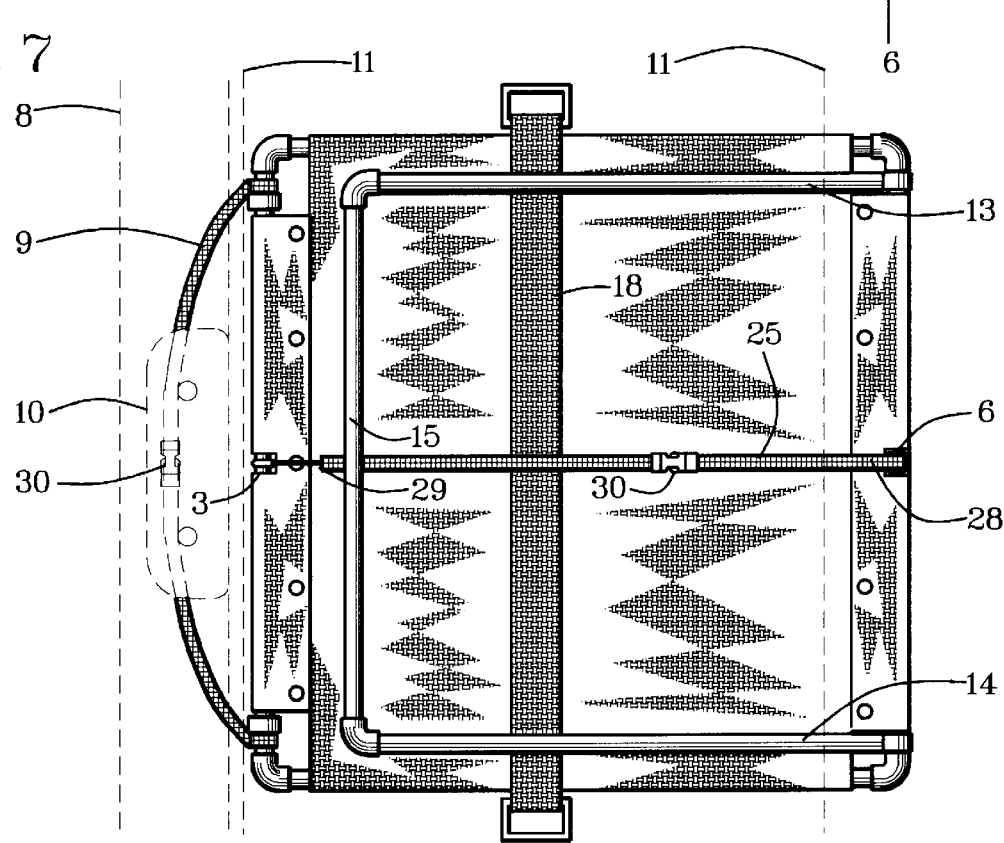
FIG. 7 is a bottom view of the FIG. 6 automobile pet-safety seat installed with a conventional seat belt loop-fastened over the line strap.
Figure 8:
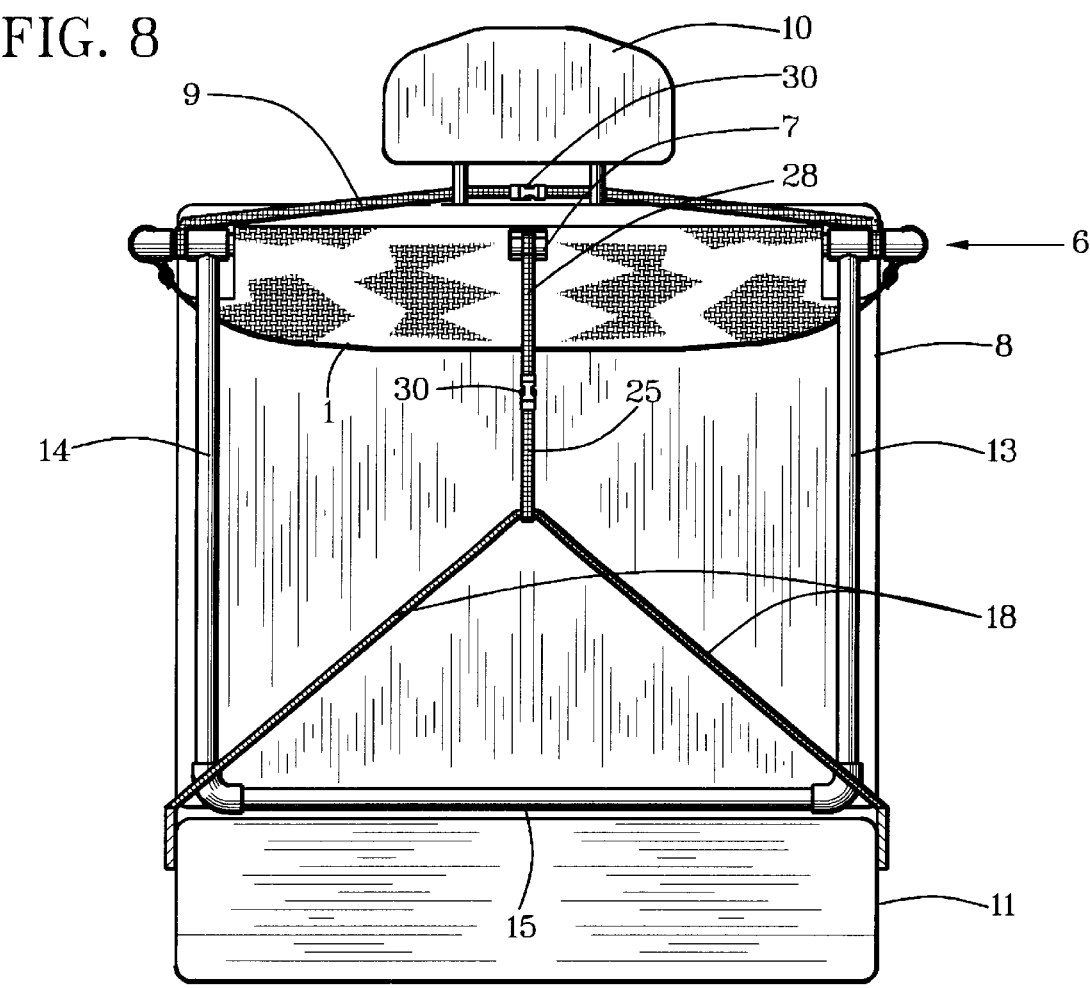
FIG. 8 is a front view of the FIG. 7 illustration.

Referring to FIGS. 1–8, the fastener strap 17 shown in FIG. 1 can include a loop strap 24 shown in FIGS. 3 and 5 or a line strap 25 shown in FIGS. 6–8. The loop strap 24 includes a first loop end 26 attached to a first side of the frame front 6 and a second loop end 27 attached to a second side of the frame front 6. The loop strap 24 is loop-fastened to the rear-rod strap 9 for being tied down by the seat belt 18. The line strap 25 has a first line end 28 that is attached to a central portion of the frame front 6 and a second line end 29 that is attached to the rear rod 3 for being tied down by the seat belt 18.

Quick-disconnect buckles 30 can be provided for convenient fastening of the rear-rod strap 9, the loop strap 24 and the line strap 25.

Preferably, the nest frame 2 is made of PVC tubes or aluminum tubes, but rod material also can be used.

The pet-seat nest 1 can be waterproof for convenient cleaning.

Figure 9:
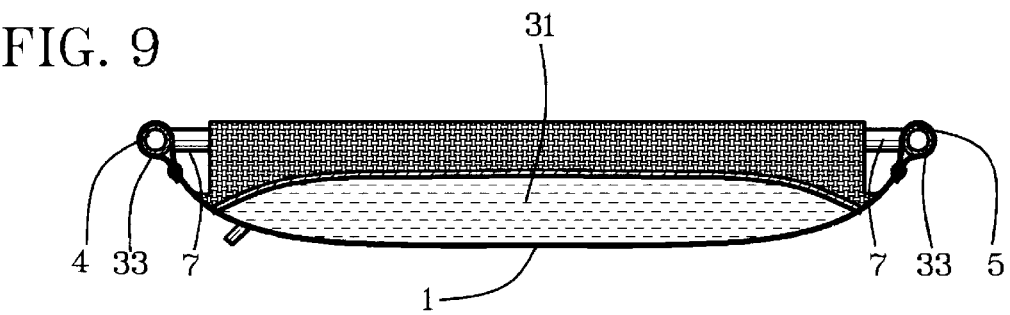
FIG. 9 is a section view taken through section line 2—2 of FIG. 2 with an inflatable pet-seat nest.
Figure 10:
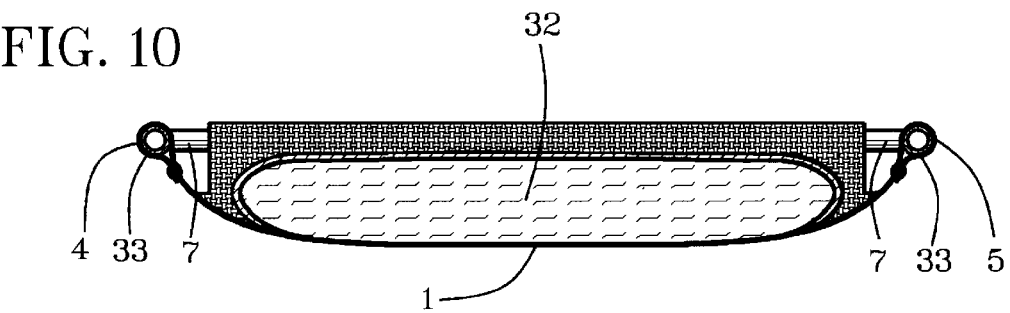
FIG. 10 is a section view taken through section line 2—2 of FIG. 2 with a cushioned pet-seat nest.

Referring to FIGS. 9–10, the pet-seat nest 1 can include cushioned covering that can be inflatable covering 31 as shown in FIG. 9 or resilient covering 32 as shown in FIG. 10. The cushioned covering may be removable for convenient cleaning.

Preferably, as detailed in FIG. 4, the horizontal rods of the nest frame 2 have cushiony padding 33 to cushion encounter and resting by a pet in the pest-seat nest 1.

As depicted in FIGS. 1–2, the pet-safety strap 19 preferably has a snap-fastener 34 for snap-fastening a pet-attachment end thereof to the pet clasp that is not shown.

As depicted in FIG. 1, this automobile pet-safety seat positions a small pet like a small dog near a car window 35, shown in dashed lines as either a front or back window, where it can see out safely with the safety advantages of the seat belt 18.

A new and useful automobile pet-safety seat having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An automobile pet safety seat comprising:

a pet seat nest that includes flexible fabric suspended arcuately downward from intermediate horizontal rods of a nest frame;

the nest frame having a rear rod, a plurality of side rods and a frame front;

the rear rod being supportable vertically in a proximately horizontal attitude by detachable attachment to a top portion of a seat back of a car seat by a strap that is loop-fixable to the car seat;

the frame front being supportable in a horizontal attitude by a frame brace that is pivotal on the frame front to an angular orientation downwardly and rearwardly;

a bottom of the frame brace being articulated for being buttressed against a generally orthogonal portion of the seat back of the car seat;

a fastener strap positioned under the pet seat nest intermediate the frame front and proximate the rear rod for being loop-fastened to an automobile by a conventional seat belt;

a pet safety strap attached to the rear rod and extended to a position of attachment to a pet clasp, and a loop strap having a first loop end attached to a first side of the frame front, a second loop end attached to a second side of the frame front and a loop portion that is loop-attachable to the head rest.

2. The automobile pet-safety seat of claim 1 wherein:

the nest frame is rectangular;

the plurality of side rods includes a first side rod and a second side rod;

the frame front includes a front rod that is parallel to the rear rod; and the pet-seat nest is attached to the rear rod, the front rod, the first side rod and the second side rod.

3. The automobile pet-safety seat of claim 1 wherein:

the frame brace includes a first brace rod attached pivotally to a first side of the frame front, a second brace rod attached pivotally to a second side of the frame front, and a bottom brace rod that is extended intermediate a bottom end of the first brace rod and a bottom end of the second brace rod.

4. The automobile pet-safety seat of claim 3 wherein:
the first brace rod and the second brace rod are parallel.

5. The automobile pet-safety seat of claim 1 wherein:
the pet-safety strap includes a snap-fastener for snap-fastening a pet-attachment end thereof to the pet clasp.

6. The automobile pet-safety seat of claim 1 wherein:
structure of the nest frame includes PVC tubes.

7. The automobile pet-safety seat of claim 1 wherein:
structure of the nest frame includes aluminum tubes.

8. The automobile pet-safety seat of claim 1 wherein:
the flexible fabric is cloth-like.

9. The automobile pet-safety seat of claim 1 wherein:
the pet-seat nest is waterproof.

10. The automobile pet-safety seat of claim 1 wherein:
the pet-seat nest includes a cushioned covering.

11. The automobile pet-safety seat of claim 1 wherein:
the pet-seat nest includes an inflatable covering.

12. The automobile pet-safety seat of claim 1 and further comprising:
cushiony padding on the horizontal rods of the net frame.

13. An automobile pet safety seat comprising:
a pet seat nest that includes flexible fabric suspended arcuately downward from intermediate horizontal rods of a nest frame;
the horizontal rods being PVC tubes;
the nest frame having a rear rod, a plurality of side rods and a frame front;
the nest frame is rectangular;
the plurality of side rods include a first side rod and a second side rod;
the frame front includes a front rod that is parallel to the rear rod that is parallel to the rear rod;
the pet seat nest being attached to the rear rod, the front rod, the first side rod and the second side rod;

the rear rod being supportable vertically in a proximately horizontal attitude by detachable attachment to a top portion of a seat back of a car seat by a strap that is loop-fixable to the car seat;

the frame front being supportable in a horizontal attitude by a frame brace that is pivotal on the frame front to an angular orientation downwardly and rearwardly;

a bottom of the frame brace being articulated for being buttressed against a generally orthogonal portion of the seat back of the car seat;

the frame brace includes a first brace rod attached pivotally to a first side of the frame front, a second brace rod attached pivotally to a second side of the frame front, and a bottom brace rod that is extended intermediate a bottom end of the first brace rod and a bottom end of the second brace rod;

a fastener 5 strap positioned under the pet seat nest intermediate the frame front and the rear rod for being loop-fastened to the automobile by a conventional seat belt;

a pet safety strap attached to the rear rod and extended to a position of attachment to a pet clasp; and a loop strap having first loop end attached to a first side of the frame front, a second loop end attached to a second side of the frame front and a loop portion that is loop-attachable to the head rest.

14. The automobile pet-safety seat of claim 13 wherein:
the pet-safety strap includes a snap-fastener for snap-fastening a pet-attachment end thereof to the pet clasp.

15. The automobile pet-safety seat of claim 13 and further comprising:
cushiony padding on the horizontal rods of the net frame.

16. The automobile pet-safety seat of claim 13 wherein:
the pet-seat nest includes a cushioned covering.

\* \* \* \* \*